United States Patent Office 2,715,623
Patented Aug. 16, 1955

2,715,623

POLYMETHIN DYES

Douglas James Fry and Bernard Alan Lea, Ilford, England, assignors to Ilford Limited, Ilford, England, a British company No Drawing. Application August 7, 1953,
Serial No. 373,063

Claims priority, application Great Britain August 18, 1952

5 Claims. (Cl. 260—240.65)

This invention relates to polymethin dyes which are of value as sensitisers for photographic silver halide emulsions.

According to the present invention there is provided a new class of polymethin dyes of the general formula:

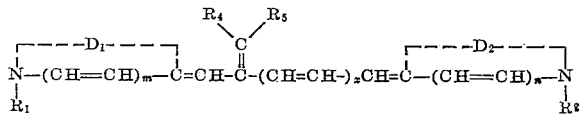

where $R_1$ and $R_3$ are alkyl, aralkyl or aryl, $R_4$ is a cyano group and $R_5$ is a cyano group or a group $COR_6$ where $R_6$ is an alkoxy, aralkoxy, aryloxy, amino or substituted amino group, $x$, $m$ and $n$ are the same or different and each is nought or one, and $D_1$ and $D_2$ are the same or different and are each a residue of a heterocyclic nucleus known from the literature to be of use in cyanine dyes. The said dyestuffs, and particularly those in which $D_1$ and $D_2$ are the residues of benzthiazole nuclei ($m$ and $n$ having the value nought), $x$ is nought, $R_1$ and $R_3$ are lower alkyl groups containing up to 4 carbon atoms, and $R_5$ is selected from cyano and carboxylic ester groups, are valuable sensitisers for photographic silver halide emulsions, imparting to silver iodobromide emulsions, for example, a strong sensitivity in the green and red regions of the spectrum. The present invention includes photographic silver halide emulsions containing the aforesaid dyestuffs in sensitising amount.

According to a further feature of the present invention, the said polymethin dyes are prepared by reacting a cyanine dye of the formula:

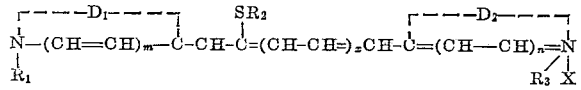

where $R_2$ is an alkyl, aralkyl or aryl group, X is an acid radicle, and the other symbols have the meanings assigned to them above, with a compound of the formula $R_4CH_2R_5$ where $R_4$ and $R_5$ have the meanings assigned to them above, the reaction being effected by heating the said compounds together in the presence of a strong base.

By the term "strong base" is meant a base at least as strong as potassium carbonate. The best yields have been found to accrue when the base used is, for example, sodium ethoxide or triethylamine.

Referring to the symbols used in the foregoing formulae, it is to be understood that where alkyl groups are referred to these may be, for example, methyl, ethyl, propyl, butyl or a higher alkyl group, where aralkyl groups are referred to these may be, for example, benzyl or naphthylmethyl, and where aryl groups are referred to these may be, for example, phenyl or naphthyl. Alkoxy, aryloxy and aralkoxy groups may be derived from any of the foregoing alkyl, aryl and aralkyl groups respectively, and amino groups may be substituted.

The residues $D_1$ and $D_2$ may be the same or different residue of thiazole, oxazole, selenazole and their polycyclic homologues such as those of the benzene, naphthalene, acenaphthene and anthracene series; pyridine and its polycyclic homologues such as quinoline and α and β naphthaquinolines; lepidines; indolenines; diazines, such as pyrimidines and quinazolines; diazoles (e. g. thio-ββ'-diazole); oxazolines, thiazolines and selenazolines, pyrazolenines, iminazolenines and triazoles. The polycyclic compounds of these series may also be substituted in the carbocyclic rings with one or more groups such as alkyl, aryl, amino, hydroxy, alkoxy and methylene dioxy groups, or by halogen atoms.

The following examples will serve to illustrate the invention:

EXAMPLE 1

1:3-bis(3-methyldihydrobenzthiazolylidene)-2-
(cyanocarbethoxymethylene)-propane 4 gm. of 3:3'-dimethyl-9-ethylthiothiacarbocyanine iodide was suspended in 20 mls. of ethylcyanoacetate and 4 mls. of triethylamine added. The mixture was heated under reflux on the water bath for 1½ hours, ethyl mercaptan being evolved. The reaction mixture was cooled and diluted with 500 mls. of ether and the red solid filtered off. After recrystallisation from 500 mls. of ethyl alcohol the product was obtained as orange-red coloured crystals, M. Pt. 238° C.

When incorporated in a silver chloro-bromide emulsion the sensitivity was extended to 6150 Å. with a broad maximum at 5100 Å., whilst in a silver iodobromide emulsion the sensitivity was extended to 6450 Å. with maxima at 5700 Å. and 6150 Å.

EXAMPLE 2

1:3-bis(3-ethyldihydrobenzthiazolylidene)-2-
(cyanocarbethoxymethylene)-propane 5 gm. of 3:3'-diethyl-9-ethylthiothiacarbocyanine iodide was mixed with 30 mls. of ethyl cyanoacetate and 4 mls. of triethylamine. The mixture was heated on the water bath under reflux for ½ hour (ethyl mercaptan being evolved), and then cooled and diluted with 750 mls. of ether. A colourless residue remained after filtration and this was discarded. The filtrate was evaporated to dryness, leaving an oil which hardened when stood in water and finally crystallised on warming with a small amount of ethyl alcohol to give a red solid. After crystallisation from 350 mls. of ethyl alcohol the product was obtained as red plates, M. Pt. 184–186° C.

When incorporated in a silver chloro-bromide emulsion the sensitivity was extended to 6500 Å. with a maximum at 5400 Å., whilst in a silver iodobromide emulsion the sensitivity was extended to 6250 Å. with a maximum at 5600 Å.

EXAMPLE 3

1:3-bis(3-ethyldihydrobenzthiazolylidene)-2-
(dicyanomethylene)-propane

A mixture of 4 gm. of 3:3'-diethyl-9-ethylthiothiacarbocyanine iodide, 4 gm. malonitrile and 2.5 mls. of triethylamine was fused under reflux on the water bath for 15 minutes, ethyl mercaptan being evolved. The mixture was cooled and diluted with 500 mls. of ether and the orange-red solid filtered off. The solid was boiled with ether to remove malonitrile and then with 100 mls. of ethyl alcohol which removed some unreacted carbocyanine dye. The residue was crystallised from 1400 mls. of ethyl alcohol and the product obtained as orange-red crystals, M. Pt. 262–263° C.

When incorporated in a silver-chloro-bromide emulsion the sensitivity was extended to 6100 Å. with a maximum at 5200 Å., whilst in a silver iodobromide emulsion the sensitivity was extended to 5900 A. with a maximum at 5200 Å.

EXAMPLE 4

*1:3 - bis(3-ethyldihydrobenzthiazolylidene)-2-(cyano-carbanilidomethylene)-propane*

A mixture of 4 gm. of 3:3'-diethyl-9-ethylthiothiacarbocyanine iodide, 4 gm. cyanacetanilide and 4 mls. triethylamine in 10 ml. of chloroform was refluxed for 8 hours. Ethyl mercaptan was evolved. The mixture was diluted with 100 mls. of chloroform and filtered, the colourless residue being discarded after washing with chloroform. From the chloroform filtrate the crude product was obtained by cautious precipitation with petroleum ether (40–60° C.), the least soluble sticky material being discarded. The crude product was dissolved in 100 mls. of ethyl alcohol and crystallized at —80° C., yielding an orange-red crystalline product with M. Pt. 134–138° C.

EXAMPLE 5

*1 - (3 - ethyldihydrobenzthiazolylidene)-2-(cyanocarbethoxy)methylene - 3-(3-methyldihydro-4:5-benzbenzthiazolylidene)-propane*

A mixture of 4 gm. of 3-ethyl-3'-methyl-9-ethylthio-4':5'-benzthiacarbocyanine bromide, 20 mls. of ethyl cyanoacetate and 4 mls. of triethylamine was heated under reflux on the water bath for 20 minutes. The mixture was then cooled and diluted with 500 mls. of ether. A colourless precipitate was filtered off and the filtrate evaporated in vacuo to leave a sticky residue which was stirred with four 200 mls. portions of petroleum ether (40–60° C.) and then dissolved in acetone. The product was obtained as a red solid by adding ether to the acetone solution, decanting from the oily precipitate and evaporating the ether solution. Repeating the procedure on the residual oil gave an additional product. The crude product was purified by dissolving in 10 ml. of a mixture of ethyl alcohol and acetone and precipitating with ether, M. Pt. 137–139° C.

EXAMPLE 6

*1:3 - bis(3-methyldihydrobenzthiazolylidene)-2-(dicyanomethylene)-propane*

A mixture of 0.5 gm. of 3:3'-dimethyl-9-methylthio-thiacarbocyanine iodide, 0.5 gm. malonitrile, 1.0 ml. chloroform (as solvent) and 0.5 ml. of triethylamine was heated under reflux on the water bath for 3½ hours, methyl mercaptan being evolved. The solvent and excess base were evaporated and the red oily residue solidified by stirring it with ether. The solid was filtered off and washed with ether and then water. It was boiled with 10 ml. of methyl alcohol, the hot mixture filtered, and the residue dissolved in 150 ml. of hot chloroform, from which, after concentration, the product separated as blue-green crystals (0.18 gm.) M. Pt. 285° C.

When incorporated in a silver iodobromide emulsion the sensitivity was extended to 5750 Å. with a maximum at 5350 Å.

EXAMPLE 7

*1 - (ethyldihydrobenzthiazolylidene)-2-(cyanocarbethoxymethylene) - 3 - (methyldihydrobenzthiazolylidene)-propane*

A mixture of 0.4 gm. 3-ethyl-3'-methyl-9-ethylthio-thiacarbocyanine iodide, 2.5 ml. ethyl cyanoacetate and 0.4 ml. triethylamine was heated under reflux on the water bath for ½ hour, ethyl mercaptan being evolved. The cooled mixture was diluted with 40 mls. of ether and an insoluble colourless solid filtered off and discarded. The filtrate was then evaporated to leave a red oil which hardened after standing for 24 hours in water and became crystalline when warmed with a small amount of ethyl alcohol. The crude dye (0.33 gm.) crystallised from 50 ml. of ethyl alcohol as scarlet crystals (0.16 gm.), M. Pt. 203–204° C.

When incorporated in a silver iodobromide emulsion the sensitivity was extended to 5950 Å. with a maximum at 5500 Å.

EXAMPLE 8

*1 - (3 - ethyl-5 - chlorodihydrobenzthiazolylidene)-2-(cyanocarbethoxymethylene) - 3 - (3 - ethyldihydrobenzthiazolylidene)-propane*

A mixture of 0.4 gm. 3:3'-diethyl-5-chloro-9-ethylthiothiacarbocyanine iodide, 2.5 ml. ethyl cyanoacetate and 0.4 ml. triethylamine was heated under reflux on the water bath for 15 minutes, ethyl mercaptan being evolved. The cooled mixture was diluted with 50 ml. of ether and a colourless solid filtered off and discarded. The filtrate was evaporated to a red oil which hardened after standing in water for 15 hours and was obtained crystalline when treated with petroleum ether (B. Pt. 40–60° C.). The very soluble crude product was dissolved in 5 ml. of benzene and some tarry material precipitated by the addition of 10 ml. of petroleum ether (B. Pt. 40–60°). The supernatant liquid was then poured into 20 ml. of petroleum ether to precipitate the product as dark red crystals (0.19 gm.), M. Pt. 124–126° C.

When incorporated in a silver chloro-bromide emulsion the sensitivity was extended to 6500 Å. with a maximum at 5400 Å., whilst in a silver iodobromide emulsion the sensitivity was extended to 5900 Å. with a maximum at 5300 Å.

EXAMPLE 9

*1:3 - bis(3 - methyl-5-phenyldihydrobenzoxazolylidene)-2-(cyanocarbethoxymethylene)-propane*

A mixture of 0.4 gm. 3:3'-dimethyl-5:5'-diphenyl-9-methylthio-oxacarbocyanine iodide, 1 ml. chloroform, 2.5 ml. ethyl cyanoacetate and 0.4 ml. triethylamine was heated under reflux on the water bath for 4 hours, methyl mercaptan being evolved. The cooled mixture was diluted with ether and filtered. The filtrate was evaporated to an oil which hardened in water and became crystalline when treated with a small volume of acetone. The crude product (0.33 gm.) crystallised from 25 ml. of methyl alcohol as pale yellow crystals, M. Pt. 217–220° C.

When incorporated in a silver chloro-bromide emulsion the sensitivity was extended to 4900 Å. with a maximum at 4500 Å.

EXAMPLE 10

*1 - (3:5:6 - trimethyldihydrobenzoxazolylidene) - 2 - (cyanocarbethoxymethylene) - 3-(3 - methyldihydrobenzthiazolylidene)-propane*

A mixture of 0.2 gm. of 3:3':5:6-tetramethyl-9-ethyl-thio-oxathiacarbocyanine iodide, 2 ml. ethyl cyanoacetate and 0.2 ml. triethylamine was heated under reflux on the water bath for 4 hours, ethyl mercaptan being evolved. The cooled mixture was diluted with ether and a colourless residue filtered off and discarded. The ether was evaporated to leave an oil which hardened to a solid on standing in water for 2 days. The product crystallised from 10 ml. of ethyl alcohol as orange plates (0.07 gm.), M. Pt. 149–150° C.

When incorporated in a silver iodobromide emulsion the sensitivity was extended to 5850 Å. with a maximum at 5400 Å.

EXAMPLE 11

*1 - (3-methyl - 5 - chlorodihydrobenzthiazolylidene) - 2-(cyano - carbethoxymethylene) - 3 - (3 - methyldihydrobenzthiazolylidene)-propane*

A mixture of 0.4 gm. 3:3'-dimethyl-5-chloro-9-ethyl-thiothiacarbocyanine iodide, 2.5 ml. ethyl cyanoacetate and 0.4 ml. triethylamine was heated under reflux on the water bath for 2½ hours, ethyl mercaptan being evolved. The cooled mixture was diluted with 80 ml. ether, a colourless residue filtered off and the filtrate evaporated to a red oil which hardened to a solid on standing in water for 48 hours. The product crystallised from 35 ml. ethyl alcohol as red needles (0.26 gm.), M. Pt. 157–159° C.

When incorporated in a silver iodobromide emulsion the sensitivity was extended to 5950 Å with a maximum at 5300 Å.

EXAMPLE 12

*1 - (3 - methyl - 5:6 - dimethoxybenzthiazolylidene) - 2- (cyano - carbethoxymethylene) - 3 - (3 - methyl - 5- chlorobenzthiazolylidene)-propane*

A mixture of 0.5 gm. 3:3′ - dimethyl - 5 - chloro- 5′:6′-dimethoxy-9-ethylthiothiacarbocyanine chloride, 4 ml. ethylcyanoacetate and 0.5 ml. triethylamine was heated under reflux on the water bath for 4½ hours. The cooled mixture was diluted with ether and filtered. The residue was washed with water to remove triethylammonium chloride. More product was obtained by evaporating the ethereal filtrate and treating the residual oil with water. The total yield of crude dye (0.42 gm.) was extracted with 25 ml. ethyl alcohol and the residue crystallised from 95 ml. of the same solvent. The red crystals (0.1 gm.) had M. Pt. 166–168° C.

When incorporated in a silver iodobromide emulsion the sensitivity was extended to 6400 Å. with maxima at 5500 Å. and 6000 Å.

EXAMPLE 13

*1 - (ethyldihydrobenzthiazolylidene) - 2 - (cyanocarbethoxymethylene) - 3 - (methyldihydrobenzthiazolylidene)-propane*

A mixture of 0.25 gm. 3-methyl-3′-ethyl-9-phenylthiothiacarbocyanine bromide, 2 ml. ethyl cyanoacetate and 0.25 ml. triethylamine was heated under reflux on the water bath for ½ hour. The experiment was continued as in Example 7 to give 0.22 gm. of crude dye.

EXAMPLE 14

*1:3 - bis(3 - methyldihydrobenzthiazolylidene) - 2 - (cyanocarbomethoxymethylene)-propane*

A mixture of 0.5 gm. 3:3′-dimethyl-9-methylthiothiacarbocyanine bromide, 4 ml. methyl cyanoacetate and 0.5 ml. triethylamine was heated under reflux on the water bath for ½ hour, methyl mercaptan being evolved. The cooled mixture was diluted with ether and filtered. The residue of dye was washed with water and more dye was obtained by evaporation of the ethereal filtrate and treatment of the residual oil with water. It crystallised from alcohol as red crystals, M. Pt. 254° C.

When incorporated in a silver iodobromide emulsion the sensitivity was extended to 6650 Å with maxima at 5650 Å. and 6250 Å.

EXAMPLE 15

*1:3 - bis(3 - ethyl - 5 - methyldihydrobenzthiazolylidene) - 2 - (cyanocarbethoxymethylene) - propane*

A mixture of 0.5 gm. 3:3′-diethyl-5:5′-dimethyl-9-ethylthiothiacarbocyanine iodide, 3.5 ml. ethyl cyanoacetate and 0.5 ml. triethylamine was heated under reflux on the water bath for ½ hour, ethyl mercaptan being evolved. The cooled residue was diluted with ether and filtered. The filtrate was evaporated to an oil which hardened on standing in water. The product crystallised from 70 ml. of ethyl alcohol as red crystals (0.25 gm.), M. Pt. 241–242° C.

When incorporated in a silver iodobromide emulsion the sensitivity was extended to 6200 Å. with a maximum at 5600 Å.

EXAMPLE 16

*1:3 - bis(3-ethyldihydrobenzthiazolylidene) 2 - (cyanocarbomethoxymethylene)-propane*

A mixture of 0.5 gm. 3:3′-diethyl-9-ethylthiothiacarbocyanine iodide, 2 ml. methylcyanoacetate and 0.5 ml. triethylamine was heated under reflux on the water bath for ½ hour, ethyl mercaptan being evolved. The cooled mixture was diluted with ether and filtered and the product (0.2 gm.) washed with water. More dye (0.16 gm.) was obtained by evaporating the ethereal filtrate and allowing the residual oil to harden by long treatment with water. The product crystallised from 20 ml. ethyl alcohol to give dark red crystals (0.1 gm.), M. Pt. 143–147° C.

When incorporated in a silver iodobromide emulsion the sensitivity was extended to 6000 Å. with a maximum at 5550 Å.

EXAMPLE 17

*1 - (3 - methyldihydrobenzthiazolylidene) - 2 - (cyanocarbomethoxymethylene) - 3 - (3-ethyldihydrobenzthiazolylidene)-propane*

A mixture of 0.4 gm. 3-ethyl-3′-methyl-9-ethylthiothiacarbocyanine iodide, 2.5 ml. methylcyanoacetate and 0.5 ml. triethylamine was heated under reflux on the water bath for 1½ hours, ethyl mercaptan being evolved. The cooled mixture was diluted with ether from which an oil separated and crystallised (0.15 gm.) when stirred with water. The ethereal layer was evaporated to an oil which hardened on standing in water to give a further 0.19 gm. of product. The dye was obtained from 14 ml. of ethyl alcohol as red crystals (0.12 gm.), M. Pt. 144–149° C.

When incorporated in a silver iodobromide emulsion the sensitivity was extended to 6200 Å. with a maximum at 5700 Å.

EXAMPLE 18

*1:3 - bis(3 - ethyl - 5 - methyldihydrobenzthiazolylidene)- 2 - (cyanocarbomethoxymethylene) - propane*

A mixture of 0.5 gm. 3:3′-diethyl-5:5′-dimethyl-9-methylthiothiacarbocyanine iodide, 2.5 ml. methylcyanoacetate and 0.5 ml. triethylamine was heated under reflux on the water bath for ¾ hour, methyl mercaptan being evolved. The cooled mixture was diluted with ether and filtered. The residue was washed with water to give 0.33 gm. of product, whilst a further 0.12 gm. was obtained by evaporating the ethereal filtrate to a red oil which hardened on standing in water. A crystallisation from 65 ml. ethyl alcohol gave 0.27 gm. of red crystals, M. Pt. 255–257° C.

When incorporated in a silver iodobromide emulsion the sensitivity was extended to 6200 Å. with a maximum at 5550 Å.

EXAMPLE 19

*1:3 - bis(3 - ethyldihydrobenzthiazolylidene) - 2 - (cyanocarbethoxymethylene)-propane*

A mixture of 0.55 gm. 3:3′-diethyl-9-ethylthiothiacarbocyanine iodide, 2.5 ml. ethyl cyanoacetate and a solution of 0.028 gm. sodium in 0.28 ml. ethyl alcohol was heated on the water bath for 10 minutes. The cooled mixture was diluted with ether and filtered. Proceeding as in Example 2 0.37 gm. of crude dye was obtained.

EXAMPLE 20

*1:3 - bis(3 - ethyldihydrobenzthiazolylidene) - 2 - (cyanocarbethoxymethylene)-propane*

A mixture of 0.28 gm. 3:3′-diethyl-9-ethylthiothiacarbocyanine iodide, 1 ml. ethyl cyanoacetate and 0.17 gm. anhydrous potassium carbonate was heated on the water bath for 7 minutes, ethyl mercaptan being evolved. Proceeding as in Example 2, 0.25 gm. of crude dye crystallised as red crystals (0.16 gm.) from 10 ml. of ethyl alcohol.

EXAMPLE 21

*1 - (3 - methyldihydrobenzthiazolylidene)-2-(cyanocarbethoxymethylene) - 5 - (1:3:3-trimethylindolinylidene)-pent-3-ene*

A mixture of 0.55 gm. 3:1′:3′:3′-tetramethyl-9-ethylthiothiaindodicarbocyanine iodide, 1.2 ml. ethyl cyanoacetate and 0.2 ml. triethylamine was stood for 10 minutes at room temperature and then heated for 2 minutes on the water bath, mercaptan being evolved. The mixture was cooled rapidly, diluted with 150 ml. of ether and filtered. The filtrate was evaporated to an oil which hardened to a solid (0.45 gm.) in water. The crude dye was dissolved in 9 ml. of ethyl alcohol and cautiously precipitated with dry ether to give a brown powder (0.14 gm.), M. Pt. 138–140° C.

When incorporated in a silver chloro-bromide emulsion, the sensitivity was extended to 7000 Å. with maxima at 5100 Å. and 5600 Å.

EXAMPLE 22

*1:3 - bis(3-ethyldihydrobenzthiazolylidene) - 2 - (cyanocarbethylamidomethylene)-propane*

A mixture of 0.55 gm. 3:3′-diethyl-9-ethylthiothiacarbocyanine iodide, 0.5 gm. cyanacetethylamide and 0.5 ml. triethylamine was heated under reflux on the water bath for 1 hour. The cooled mixture was diluted with 50 ml. of water and filtered. The residue was washed with water and dried (0.42 gm.), and finally obtained as red-brown crystals (0.08 gm.) from 15 ml. of ethyl alcohol, M. Pt. 155° C.

When incorporated in a silver iodobromide emulsion the sensitivity was extended to 6500 Å. with a maximum at 5600 Å.

What we claim is:

1. A polymethine dye of the general formula:

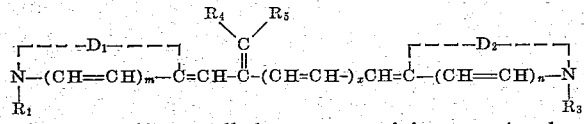

where $R_1$ and $R_3$ are alkyl groups containing up to 4 carbon atoms, $R_4$ is a cyano group, $R_5$ is a group selected from the class consisting of the cyano group and $COR_6$ groups where $R_6$ is itself selected from the class consisting of alkoxy groups containing up to 4 carbon atoms, amino, alkylamino and phenylamino groups, $x$, $m$ and $n$ are each selected from nought and one and $D_1$ and $D_2$ are each the residue of a heterocyclic nucleus of the type known in cyanine dyes.

2. A polymethine dye of the formula:

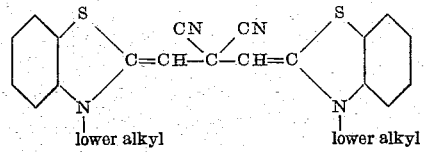

3. A polymethine dye of the formula:

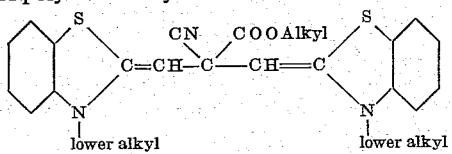

4. A process for the production of a polymethine dye of the general formula:

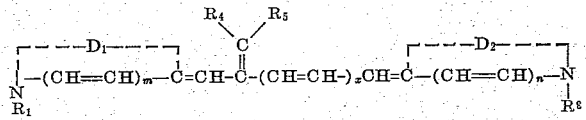

where $R_1$ and $R_3$ are alkyl groups containing up to 4 carbon atoms, $R_4$ is a cyano group, $R_5$ is a group selected from the class consisting of the cyano group and $COR_6$ groups where $R_6$ is itself selected from the class consisting of alkoxy groups containing up to 4 carbon atoms, amino, alkylamino and phenylamino groups, $x$, $m$ and $n$ are each selected from nought and one and $D_1$ and $D_2$ are each the residue of a heterocyclic nucleus of the type known in cyanine dyes, which comprises treating a compound of the general formula:

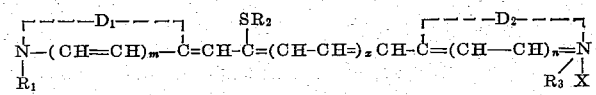

where $R_2$ is selected from the class consisting of alkyl and phenyl groups and X is an acid radicle, with a compound of the formula $R_4CH_2R_5$ in the presence of a strong base.

5. A process according to claim 4 wherein the base employed is selected from the class consisting of alkali carbonate, alkali ethoxide and triethylamine.

References Cited in the file of this patent
UNITED STATES PATENTS

| Number | Name | Date |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chem. Abstracts 16:3101, Abstract of Brit. Med. Jour., 1922, I, 514–515.

Chem. Abstracts 19:530, Abstract of Proc. Roy. Soc., London, 96B, 317–333, 1924.